United States Patent
Kikuchi et al.

(10) Patent No.: US 9,365,129 B2
(45) Date of Patent: Jun. 14, 2016

(54) VEHICLE HAVING AN ELECTRIC MOTOR AND METHOD OF CONTROLLING A DISPLAY DISPLAYING A CRUISING DISTANCE OF THE VEHICLE

(75) Inventors: Takuro Kikuchi, Ichinomiya (JP); Koji Aridome, Toyota (JP); Junta Izumi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/386,986

(22) PCT Filed: Apr. 20, 2012

(86) PCT No.: PCT/JP2012/002758
§ 371 (c)(1),
(2), (4) Date: Sep. 22, 2014

(87) PCT Pub. No.: WO2013/157050
PCT Pub. Date: Oct. 24, 2013

(65) Prior Publication Data
US 2015/0066344 A1  Mar. 5, 2015

(51) Int. Cl.
*B60L 11/18* (2006.01)
*B60L 3/12* (2006.01)
(Continued)

(52) U.S. Cl.
CPC .............. *B60L 11/1861* (2013.01); *B60L 3/00* (2013.01); *B60L 3/12* (2013.01); *B60L 11/005* (2013.01);
(Continued)

(58) Field of Classification Search
CPC ............ B60L 2250/16; B60L 2260/52; B60L 2260/54; B60L 11/1861; B60K 2350/1092

USPC ...................... 701/22; 73/114.54; 703/114.54
See application file for complete search history.

(56) References Cited

U.S. PATENT DOCUMENTS 5,686,895 A * 11/1997 Nakai .................. B60L 3/12
340/439
5,698,983 A  12/1997 Arai et al.
(Continued)

FOREIGN PATENT DOCUMENTS

JP  A-8-278355  10/1996
JP  A-10-293164  11/1998
(Continued)

OTHER PUBLICATIONS

English language translation of International application PCT/JP2009/069470 (published on May 26, 2011 as WO 2011/061809).*

*Primary Examiner* — Behrang Badii
*Assistant Examiner* — David Testardi
(74) *Attorney, Agent, or Firm* — Oliff PLC

(57) ABSTRACT

A motor generates a kinetic energy for use in running of a vehicle. An electric storage apparatus is charged and discharged and outputs a driving electric power for the motor through the discharge. A display displays a cruising distance over which the vehicle can be run with the motor. A controller calculates the cruising distance based on a full charge capacity of the electric storage apparatus and displays the cruising distance on the display. When the full charge capacity at a present time is smaller than the full charge capacity at a past time and the electric storage apparatus is not discharged, or when the full charge capacity at the present time is larger than the full charge capacity at the past time and the electric storage apparatus is not charged, the controller displays the cruising distance based on the full charge capacity at the past time on the display.

8 Claims, 8 Drawing Sheets

(51) Int. Cl.
*B60L 11/00* (2006.01)
*B60L 3/00* (2006.01)

(52) U.S. Cl.
CPC ............ *B60L 11/18* (2013.01); *B60L 11/1803* (2013.01); *B60L 11/1864* (2013.01); *B60L 2240/12* (2013.01); *B60L 2250/16* (2013.01); *B60L 2260/52* (2013.01); *B60L 2260/54* (2013.01); *B60L 2270/20* (2013.01); *Y02T 10/7005* (2013.01); *Y02T 10/7022* (2013.01); *Y02T 10/7044* (2013.01); *Y02T 10/7061* (2013.01)

(56) References Cited

U.S. PATENT DOCUMENTS

| | | | | |
|---|---|---|---|---|
| 6,932,174 | B2 * | 8/2005 | Hirata | B60L 11/1851 180/65.245 |
| 8,121,802 | B2 * | 2/2012 | Grider | B60L 15/2045 702/63 |
| 8,362,891 | B2 * | 1/2013 | Schumann | B60K 35/00 180/65.21 |
| 8,406,948 | B2 * | 3/2013 | Wang | B60K 35/00 340/438 |
| 8,433,455 | B2 * | 4/2013 | Siy | B60L 1/02 701/1 |
| 8,521,408 | B2 * | 8/2013 | Cho | B60L 11/1838 180/65.29 |
| 8,538,613 | B2 * | 9/2013 | Kinser | B60L 11/14 701/22 |
| 8,712,619 | B2 * | 4/2014 | Kusumi | B60K 6/46 180/2.2 |
| 2003/0094321 | A1 | 5/2003 | Hirata et al. | |
| 2012/0116606 | A1 * | 5/2012 | Ichinokawa | B60K 35/00 701/1 |
| 2013/0073113 | A1 * | 3/2013 | Wang | B60K 6/445 701/1 |

FOREIGN PATENT DOCUMENTS

| | | | |
|---|---|---|---|
| JP | H11-102732 | A | 4/1999 |
| JP | A-2001-21629 | | 1/2001 |
| JP | A-2003-164006 | | 6/2003 |
| JP | 2005-80376 | A * | 3/2005 |
| JP | 2008-61362 | A * | 3/2008 |
| JP | A-2008-61362 | | 3/2008 |
| JP | 2008-83022 | A * | 4/2008 |
| JP | A-2011-7564 | | 1/2011 |
| JP | A-2012-50293 | | 3/2012 |
| JP | 2012-210133 | A * | 10/2012 |
| WO | WO 2010/150076 | A1 | 12/2010 |
| WO | WO 2011/061809 | A1 * | 5/2011 |

* cited by examiner

VEHICLE HAVING AN ELECTRIC MOTOR AND METHOD OF CONTROLLING A DISPLAY DISPLAYING A CRUISING DISTANCE OF THE VEHICLE

TECHNICAL FIELD

The present invention relates to a technique, used in a vehicle capable of running with an output from an electric storage apparatus, for displaying on a display a cruising distance over which the vehicle can be run.

BACKGROUND ART

In some vehicles, a secondary battery is mounted, and the output from the secondary battery is used for running. In this case, a cruising distance over which the vehicle can be run can be calculated on the basis of the full charge capacity of the secondary battery. The cruising distance is displayed on a display installed on the vehicle. An occupant of the vehicle can check the cruising distance by looking at the display.

PRIOR ART DOCUMENTS

Patent Documents

[Patent Document 1] Japanese Patent Laid-Open No. 2011-007564
[Patent Document 2] Japanese Patent Laid-Open No. 08-278355
[Patent Document 3] Japanese Patent Laid-Open No. 10-293164
[Patent Document 4] Japanese Patent Laid-Open No. 2003-164006
[Patent Document 5] Japanese Patent Laid-Open No. 2001-021629

DISCLOSURE OF THE INVENTION

Problems to be Solved by the Invention

The full charge capacity of the secondary battery may change depending on the deterioration of the secondary battery and the like. When the full charge capacity of the secondary battery changes, and the cruising distance is changed in response to the change in the full charge capacity, it may give an unnatural feeling to the occupant (particularly, a driver) who checks the cruising distance displayed on the display. For example, if the cruising distance is reduced in response to the change in full charge capacity even though the vehicle is not run with the discharge of the secondary battery, it gives the unnatural feeling to the occupant.

Means for Solving the Problems

According to a first aspect, the present invention provides a vehicle including a motor, an electric storage apparatus, a display, and a controller. The motor generates a kinetic energy for use in running of the vehicle. The electric storage apparatus is charged and discharged and outputs a driving electric power for the motor through the discharge. The display displays a cruising distance over which the vehicle can be run with the motor. The controller calculates the cruising distance based on full charge capacity of the electric storage apparatus and displays the cruising distance on the display.

The controller calculates the full charge capacity of the electric storage apparatus. When the full charge capacity at a present time is smaller than the full charge capacity at a past time and the electric storage apparatus is not discharged, or when the full charge capacity at the present time is larger than the full charge capacity at the past time and the electric storage apparatus is not charged, the controller displays the cruising distance based on the full charge capacity at the past time on the display.

When the full charge capacity of the electric storage apparatus changes, and the cruising distance is also changed in response to the change in the full charge capacity, it may give an unnatural feeling to an occupant (particularly, a driver) of the vehicle. Specifically, when the present full charge capacity is smaller than the past full charge capacity, and the cruising distance is also changed with the change in the full charge capacity, the cruising distance is reduced. When the cruising distance is reduced even though the electric storage apparatus is not discharged, in other words, even though the vehicle is not run with the output from the electric storage apparatus, it gives the unnatural feeling to the occupant.

To address this, in the first aspect of the present invention, when the present full charge capacity is smaller than the past full charge capacity, and the electric storage apparatus is not discharged, the cruising distance based on the past full charge capacity can be displayed on the display to avoid an unintended reduction in the cruising distance. This can prevent the unnatural feeling given to the occupant for the cruising distance displayed on the display.

When the present full charge capacity is larger than the past full charge capacity, and the cruising distance is also changed with the change in the full charge capacity, the cruising distance is increased. When the cruising distance is increased even though the electric storage apparatus is not charged, it gives the unnatural feeling to the occupant. To address this, in the first aspect of the present invention, when the present full charge capacity is larger than the past full charge capacity, and the electric storage apparatus is not charged, the cruising distance based on the past full charge capacity can be displayed on the display to avoid an unintended increase in the cruising distance. This can prevent the unnatural feeling given to occupant for the cruising distance displayed on the display.

When the present full charge capacity is smaller than the past full charge capacity, the full charge capacity for use in calculating the cruising distance can be brought closer to the present full charge capacity from the past full charge capacity in response to the discharge of the electric storage apparatus. When the full charge capacity is calculated, the full charge capacity for use in calculating the cruising distance is preferably changed to the present full charge capacity. The cruising distance is reduced during the running of the vehicle with the discharge of the electric storage apparatus. When the past full charge capacity is changed to the present full charge capacity in association with the discharge, the full charge capacity for use in calculating the cruising distance can be changed to the present full charge capacity without giving the unnatural feeling to the occupant who checks the cruising distance displayed on the display.

When the electric storage apparatus is not discharged, the change from the past full charge capacity to the present full charge capacity can be eliminated. The elimination of the change in the full charge capacity can eliminate any change in the cruising distance to avoid a situation in which the cruising distance is reduced even though the discharge is not performed. Examples of the case when the electric storage apparatus is not discharged include the case when the electric storage apparatus is not charged or discharged and the case when the electric storage apparatus is charged.

When the present full charge capacity is larger than the past full charge capacity, the full charge capacity for use in calculating the cruising distance can be brought closer to the present full charge capacity from the past full charge capacity in response to the charge of the electric storage apparatus. The charge of the electric storage apparatus can increase the cruising distance. When the full charge capacity for use in calculating the cruising distance is changed from the past full charge capacity to the present full charge capacity in association with the charge, the full charge capacity for use in calculating the cruising distance can be changed to the present full charge capacity without giving the unnatural feeling to the occupant who checks the cruising distance displayed on the display.

When the electric storage apparatus is not charged, the change from the past full charge capacity to the present full charge capacity can be eliminated. The elimination of the change in the full charge capacity can eliminate any change in the cruising distance to avoid a situation in which the cruising distance is increased even though the charge is not performed. Examples of the case when the electric storage apparatus is not charged include the case when the electric storage apparatus is not charged or discharged and the case when the electric storage apparatus is discharged.

The full charge capacity for use in calculating the cruising distance can be brought closer to the present full charge capacity stepwise from the past full charge capacity. The stepwise change in the full charge capacity for use in calculating the cruising distance allows the resulting change in the cruising distance calculated from the full charge capacity to be less perceptible to the occupant, thereby preventing the unnatural feeling from being given to the occupant.

When the present and past full charge capacities are different from each other, the past full charge capacity can be changed to the present full charge capacity, and the cruising distance based on the past full charge capacity can be displayed on the display. When the full charge capacity is calculated, the last full charge capacity is preferably used. For example, for calculating the SOC of the electric storage apparatus, the last full charge capacity is preferably used. Thus, when the full charge capacity is calculated, the past full charge capacity can be changed to the present full charge capacity.

Regarding the cruising distance displayed on the display, even when the past full charge capacity is changed to the present full charge capacity, the cruising distance displayed on the display is preferably based on the past full charge capacity as described above to prevent the unnatural feeling to the occupant.

According to a second aspect, the present invention provides a method of controlling a display displaying a cruising distance over which a vehicle can be run with a motor. First, a full charge capacity of an electric storage apparatus charged and discharged and outputting a driving electric power for the motor is calculated. When the full charge capacity at a present time is smaller than the full charge capacity at a past time and the electric storage apparatus is not discharged, or when the full charge capacity at the present time is larger than the full charge capacity at the past time and the electric storage apparatus is not charged, the cruising distance based on the full charge capacity at the past time is displayed on the display. The second aspect of the present invention also provides the same advantages as those in the first aspect.

MODE FOR CARRYING OUT THE INVENTION

Preferred embodiments of the present invention will hereinafter be described.

Embodiment 1

Figure 1:
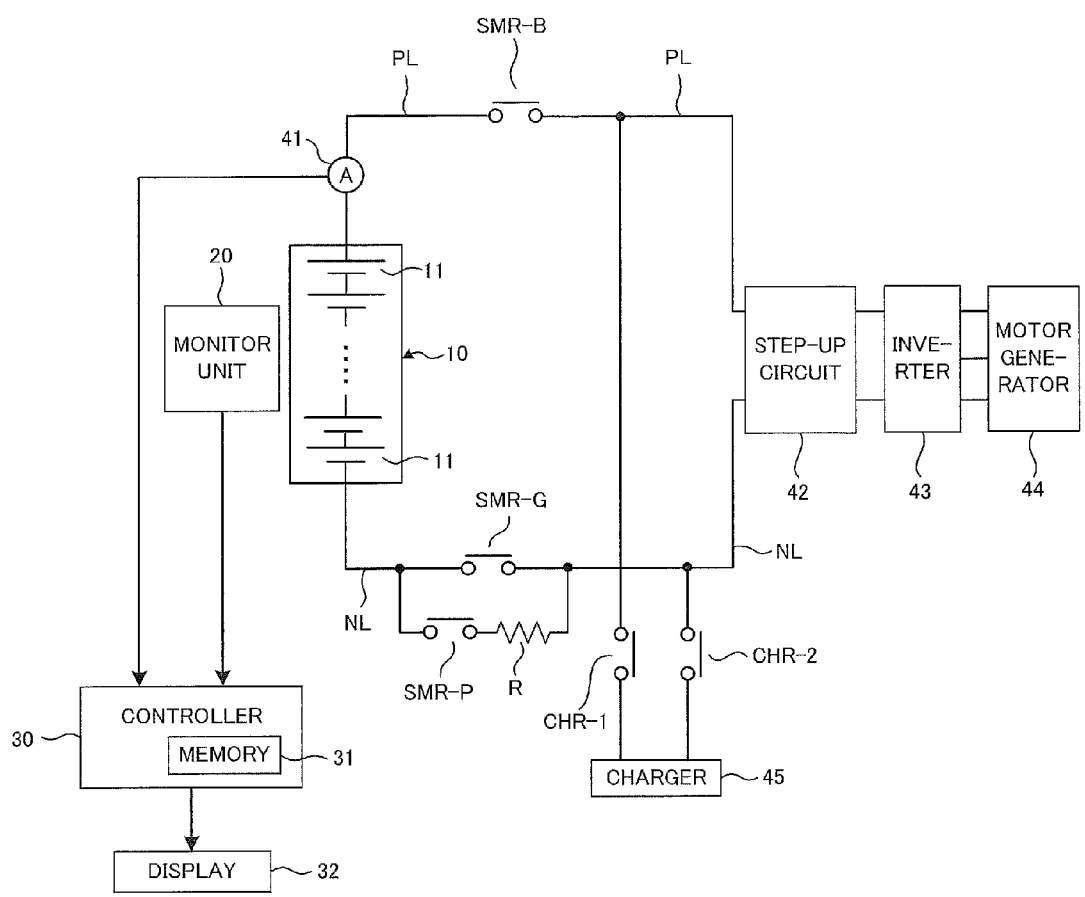
FIG. 1 is a diagram showing the configuration of a battery system.

A battery system which is Embodiment 1 of the present invention is now described with reference to FIG. 1. FIG. 1 is a diagram showing the configuration of the battery system. The battery system of the present embodiment is mounted on a vehicle.

Examples of the vehicle include a hybrid vehicle and an electric vehicle. The hybrid vehicle includes an engine or a fuel cell in addition to an assembled battery, later described, as the power source for running the vehicle. The electric vehicle includes only the assembled battery, later described, as the power source for running the vehicle. In the hybrid vehicle and the electric vehicle, the assembled battery can be charged with electric power supplied from an external power source, as later described.

The assembled battery (corresponding to an electric storage apparatus) 10 has a plurality of cells 11 connected electrically in series. A secondary battery such as a nickel metal hydride battery or a lithium-ion battery can be used as the cell 11. An electric double layer capacity may be used instead of the secondary battery. The number of the cells 11 can be set as appropriate on the basis of the output or the like required of the assembled battery 10. Although all the cells 11 constituting the assembled battery 10 are connected electrically in series in the present embodiment, the assembled battery 10 may include a plurality of cells 11 connected electrically in parallel.

A monitor unit 20 detects the voltage of the cell 11 or detects the voltage of the assembled battery 10, and outputs the detection result to a controller 30. When all the cells 11 constituting the assembled battery 10 are divided into a plurality of battery blocks, the monitor unit 20 can detect the voltage of each of the battery blocks. Each of the battery blocks is formed of a plurality of cells 11 connected electrically in series, and the plurality of battery blocks are connected electrically in series to constitute the assembled battery 10.

A current sensor 41 detects an electric current passing through the assembled battery 10 and outputs the detection result to the controller 30. In the present embodiment, the current is set at a positive value when the assembled battery 10 is discharged, or the current is set at a negative value when the assembled battery 10 is charged. The controller 30 has a memory 31. The memory 31 stores various types of information for allowing the controller 30 to perform predetermined processing operations. Although the memory 31 is contained in the controller 30 in the present embodiment, the memory 31 may be provided outside the controller 30.

A system main relay SMR-B is provided on a positive electrode line PL for the assembled battery 10. The system main relay SMR-B is switched between ON and OFF in response to a control signal from the controller 30. A system main relay SMR-G is provided on a negative electrode line NL for the assembled battery 10. The system main relay SMR-G is switched between ON and OFF in response to a control signal from the controller 30.

The system main relay SMR-G is connected electrically in parallel to a system main relay SMR-P and a current limiting resistor R. The system main relay SMR-P and the current limiting resistor R are connected electrically in series. The system main relay SMR-P is switched between ON and OFF in response to a control signal from the controller 30. The current limiting resistor R is used to prevent an inrush current from passing in connecting the assembled battery 10 to a load (such as a step-up circuit 42, later described).

In connecting the assembled battery 10 to the load, the controller 30 first switches the system main relays SMR-B and SMR-P from OFF to ON. Information about ON and OFF of an ignition switch of the vehicle is input to the controller 30. The controller 30 receives the information about ON of the ignition switch to start the connection between the assembled battery 10 and the load.

The turn-on of the system main relays SMR-B and SMR-P can pass a current through the current limiting resistor R. Next, the controller 30 switches the system main relay SMR-G from OFF to ON and then switches the system main relay SMR-P from ON to OFF. This completes the connection between the assembled battery 10 and the load to render the battery system shown in FIG. 1 operative (Ready-On).

On the other hand, when the ignition switch is turned from ON to OFF while the battery system is operative, the controller 30 switches the system main relays SMR-B and SMR-G from ON to OFF. This can break the connection between the assembled battery 10 and the load to render the battery system inoperative (Ready-Off).

The step-up circuit 42 is connected to the assembled battery 10 through the positive electrode line PL and the negative electrode line NL and increases an output voltage from the assembled battery 10. The step-up circuit 42 outputs the electric power at the increased voltage to an inverter 43. The step-up circuit 42 also reduces an output voltage from the inverter 43 and outputs the electric power at the reduced voltage to the assembled battery 10. Although the step-up circuit 42 is used in the battery system of the present embodiment, the step-up circuit 42 may be omitted.

The inverter 43 converts a DC power output from the step-up circuit 42 into an AC power and outputs the AC power to a motor generator 44. A three-phase AC motor can be used as the motor generator 44, for example. The motor generator 44 receives the AC power output from the inverter 43 to generate a kinetic energy for running of the vehicle. The kinetic energy generated by the motor generator 44 is transferred to wheels to allow the running of the vehicle.

For decelerating or stopping the vehicle, the motor generator 44 converts a kinetic energy generated in braking of the vehicle into an electric energy (AC power). The inverter 43 converts the AC power generated by the motor generator 44 into a DC power and outputs the DC power to the step-up circuit 42. The step-up circuit 42 reduces the voltage output from the inverter 43 and outputs the electric power at the reduced voltage from the inverter 43 to the assembled battery 10. Thus, the assembled battery 10 can store the regenerative power.

A charger 45 is connected to the positive electrode line PL and the negative electrode line NL through charge relays CHR-1 and CHR-2. The charger 45 is used for supplying the electric power from the external power source to the assembled battery 10. Charge of the assembled battery 10 with the external power source is referred to as external charge. The external power source refers to a power source (for example, a commercial power source) provided outside and independently of the vehicle on which the battery system is mounted. A wired or wireless path can be used for supplying the electric power from the external power source to the assembled battery 10.

On the wired electric power supply path, a connector (so called a plug) connected to the external power source through a cable can be connected to a connector (so called an inlet) connected to the charger 45 to supply the electric power of the external power source to the assembled battery 10. On the wireless electric power supply path, the electric power of the external power source can be supplied to the assembled battery 10 by using a non-contact charge system based on an electromagnetic induction or resonance phenomenon.

When the external power source supplies an AC power, the charger 45 converts the AC power from the external power source into a DC power and supplies the DC power to the assembled battery 10. When the external power source supplies a DC power to the battery system, the DC power is directly supplied to the assembled battery 10. In supplying the electric power (AC power or DC power) from the external power source to the assembled battery 10, the voltage may be changed.

In performing the external charge, the full charge capacity of the assembled battery 10 can be calculated. The full charge capacity of the assembled battery 10 may be reduced as the assembled battery 10 is deteriorated. For example, when the lithium-ion secondary battery is used as the cell 11, a deterioration phenomenon involving the precipitation of lithium may reduce the full charge capacity of the cell 11. The reduced full charge capacity of the cell 11 reduces the full charge capacity of the assembled battery 10.

The full charge capacity of the assembled battery 10 is used to calculate the SOC (State Of Charge) of the assembled battery 10 or to calculate the cruising distance of the vehicle. The SOC represents a ratio of the present charge capacity to the full charge capacity of the assembled battery 10. The cruising distance represents the distance over which the vehicle can be run by using only the output from the assembled battery 10. Once the full charge capacity of the assembled battery 10 is found, the cruising distance when the assembled battery 10 is fully charged can be calculated.

Specifically, the correspondence between the full charge capacity and the cruising distance can be previously determined to calculate the cruising distance associated with the full charge capacity. When the assembled battery 10 is discharged to run the vehicle, the charge capacity (voltage) of the assembled battery 10 is reduced. The cruising distance is reduced with the reduced charge capacity.

A display 32 displays information about the running state of the vehicle. The information about the running state of the vehicle includes, for example, the cruising distance described above, the running speed of the vehicle, and the charge/discharge state of the assembled battery 10. The driver or the like can check the running state of the vehicle by looking at the display 32. The controller 30 outputs a control signal to the display 32 to control the items displayed on the display 32. The items displayed on the display 32 can be set as appropriate. It is only required that the driver or the like can check the running state of the vehicle by looking at the display 32.

Figure 2:
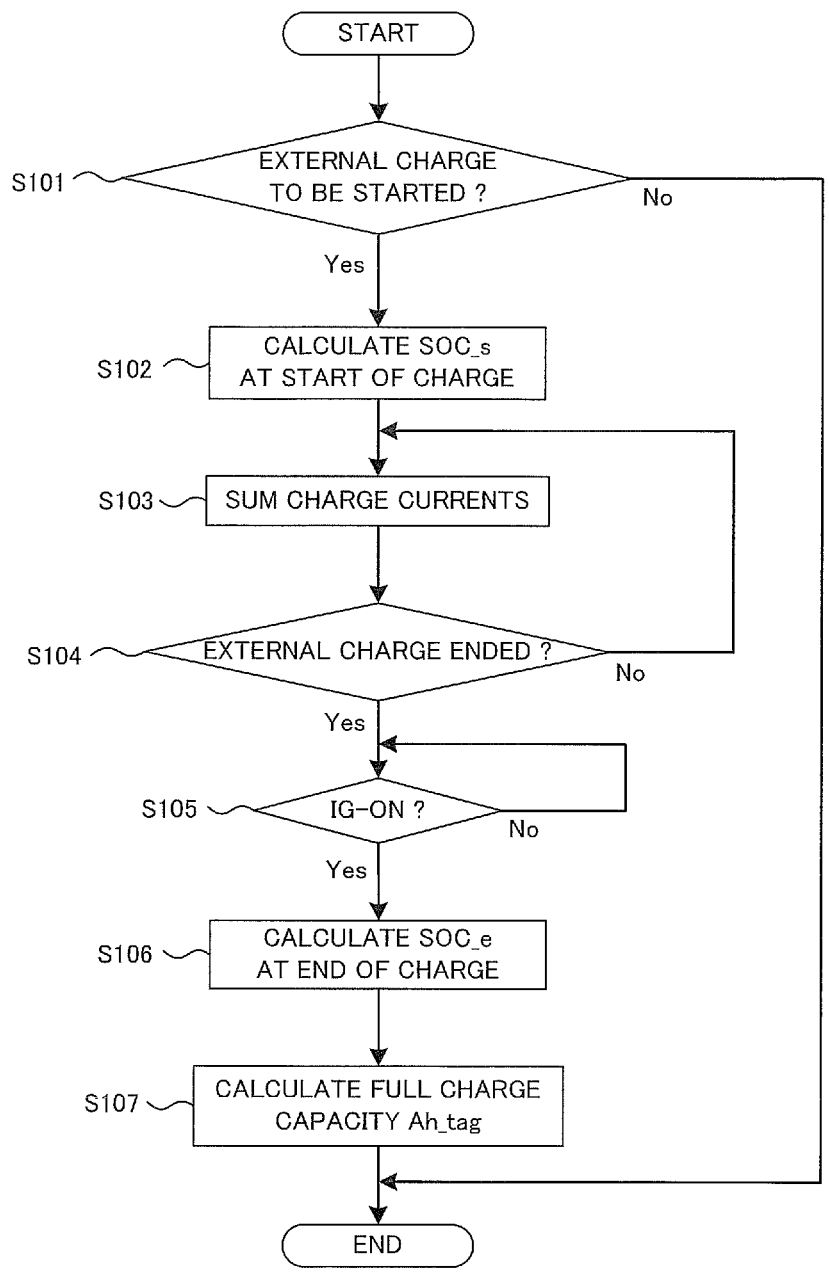
FIG. 2 is a flow chart showing processing of calculating a full charge capacity.

Next, description is made of processing of calculating the full charge capacity of the assembled battery 10 with reference to a flow chart shown in FIG. 2. The processing shown in FIG. 2 is performed by the controller 30. At the start of the processing shown in FIG. 2, the ignition switch is OFF.

At step S101, the controller 30 determines whether or not the external charge is to be started. For example, the controller 30 can determine whether or not the external charge is to be started by determining whether or not the connector (plug) connected to the external power source is connected to the connector (inlet) connected to the charger 45. The controller 30 can determine that the external charge is to be started by recognizing that the connector (plug) is connected to the connector (inlet).

The processing at step S101 is only required to determine whether or not the external power source is ready to supply the electric power to the assembled battery 10. When the external charge is to be started, the controller 30 proceeds to processing at step S102. Otherwise, the controller 30 ends the processing shown in FIG. 2.

At step S102, the controller 30 calculates a SOC_s of the assembled battery 10 at the start of the external charge. Since the SOC of the assembled battery 10 is associated with the OCV of the assembled battery 10, the SOC of the assembled battery 10 can be specified by previously determining the correspondence between the SOC and the OCV by an experiment or the like and then measuring the OCV of the assembled battery 10.

While the assembled battery 10 is charged or discharged or immediately after the assembled battery 10 is charged or discharged, polarization occurs, and the voltage (CCV: Closed Circuit Voltage) detected by the monitor unit 20 may include a voltage change amount resulting from the polarization. If the monitor unit 20 detects the voltage of the assembled battery 10 in which the polarization is eliminated, the voltage change amount resulting from the polarization can be removed. The polarization can be changed to be eliminated by leaving the assembled battery 10 without charge and discharge. A time period for eliminating the polarization can be previously set, and the elimination of the polarization can be determined by seeing that the time period for leaving the assembled battery 10 without charge and discharge exceeds the time period for eliminating the polarization.

The voltage detected by the monitor unit 20 may include a voltage change amount associated with the internal resistance of the cell 11. To address this, a small current which insignificantly influences the voltage change amount associated with the internal resistance is passed through the assembled battery 10, and then the voltage of the assembled battery 10 is detected, thereby facilitating the detection of the OCV of the assembled battery 10. In other words, the voltage (CCV) detected by the monitor unit 20 when the voltage change amounts caused by the polarization and the internal resistance are negligible can be regarded as the OCV.

The method of estimating the SOC of the assembled battery 10 is not limited to that described above, and a known approach can be employed as appropriate. For example, the present SOC of the assembled battery 10 can be estimated by summing the currents passing through the assembled battery 10. After the SOC_s of the assembled battery 10 is calculated, the external charge of the assembled battery 10 is started.

At step S103, the controller 30 acquires the current passing through the assembled battery 10 in the output from the current sensor 41 during the external charge. Since the assembled battery 10 is charged, the current detected by the current sensor 41 has a negative value. The controller 30 sums the currents acquired by the current sensor 41 during the external charge.

At step S104, the controller 30 determines whether or not the external charge is ended. For example, once the assembled battery 10 is fully charged, the external charge is ended. Alternatively, the external charge may be ended before the assembled battery 10 is fully charged.

For example, the controller 30 can determine that the external charge is ended when the connector (plug) connected to the external power source is pulled out of the connector (inlet) connected to the charger 45. When the external charge is ended, the controller 30 proceeds to processing at step S105. When the external charge is not ended, the controller 30 performs the processing at step S103.

At step S105, the controller 30 waits until the ignition switch is switched from OFF to ON. When the ignition switch is switched from OFF to ON, the controller 30 calculates a SOC_e of the assembled battery 10 at the end of the external charge at step S106. The SOC_e of the assembled battery 10 can be calculated with the method described in the processing at step S102.

At step S107, the controller 30 calculates a full charge capacity Ah_tag of the assembled battery 10. Specifically, the controller 30 can calculate the full charge capacity Ah_tag of the assembled battery 10 according to the following expression (1):

$$Ah\_tag = \frac{\sum I \times 100}{SOC\_e - SOC\_s} \quad (1)$$

In the expression (1), $\Sigma I$ represents the current sum value during the external charge and is the value acquired in the processing at step S103. SOC_s represents the SOC of the assembled battery 10 at the start of the external charge and is provided by using the value acquired in the processing at step S102. The SOC_e represents the SOC of the assembled battery 10 at the end of the external charge and is provided by using the value acquired in the processing at step S106. The external charge results in the SOC_e higher than the SOC_s.

To improve the accuracy in estimating the full charge capacity Ah_tag, the difference between the temperature of the assembled battery 10 during the calculation of the SOC_s and the temperature of the assembled battery 10 during the calculation of the SOC_e preferably falls within an allowable range. The temperature difference is preferably minimized. Since the current detected by the current sensor 41 may include a detection error, the current sum value is preferably calculated under a condition that the influence of the detection error can be reduced. For example, if the charge current of the assembled battery 10 is extremely small, the detection error forms a large proportion of the current detected by the current sensor 41. On the other hand, as the charge current of the assembled battery 10 is increased, the proportion of the detection error can be reduced in the current detected by the current sensor 41. In other words, the influence of the detection error can be reduced.

Although the present embodiment includes the calculation of the full charge capacity Ah_tag of the assembled battery 10 in performing the external charge, the present invention is not limited thereto. Specifically, when the assembled battery 10 is charged or discharged, the SOC of the assembled battery 10 can be calculated at two different times, the current sum value can be calculated between the two times, and the calculated SOCs and the current sum value can be substituted into the expression (1) to calculate the full charge capacity Ah_tag of the assembled battery 10. In this case, the full charge capacity Ah_tag can be calculated during the running of the vehicle, or the full charge capacity Ah_tag can be calculated while a mode for forcedly discharging the assembled battery 10 is set, by way of example.

Figure 3:
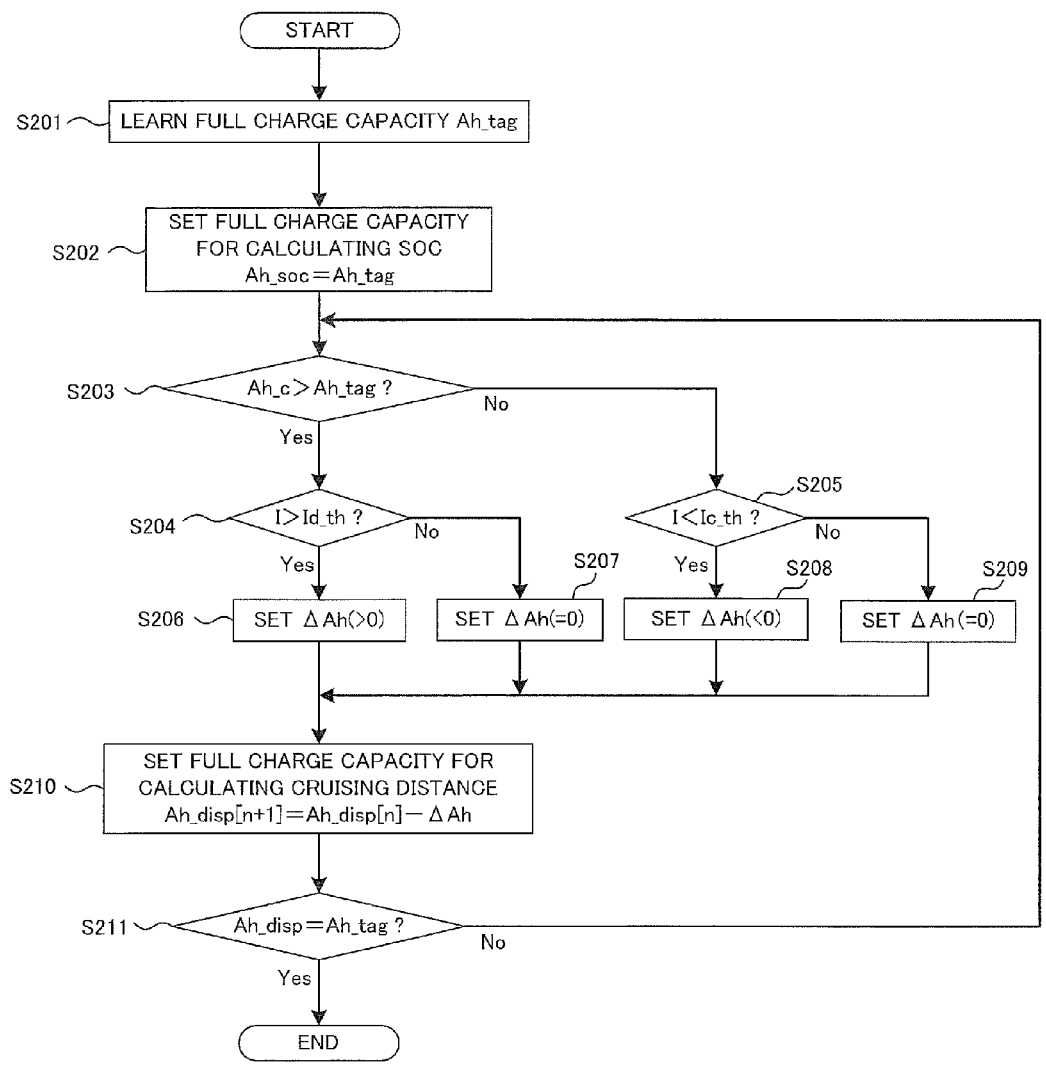
FIG. 3 is a flow chart showing processing of setting a full charge capacity for use in calculating a cruising distance in Embodiment 1.

Next, description is made of a method of setting a full charge capacity for use in calculating the cruising distance with reference to a flow chart shown in FIG. 3. The processing shown in FIG. 3 is performed by the controller 30. The processing shown in FIG. 3 is performed while the ignition switch is ON.

At step S201, the controller 30 calculates (learns) the full charge capacity Ah_tag of the assembled battery 10. The full charge capacity Ah_tag can be calculated through the processing described in FIG. 2. The calculated full charge capacity Ah_tag is stored in the memory 31.

At step S202, the controller 30 sets the full charge capacity Ah_tag obtained in the processing at step S201 as a full charge capacity Ah_soc for use in calculating the SOC of the assembled battery 10. This allows the controller 30 to calculate the SOC of the assembled battery 10 based on the full charge capacity Ah_tag.

At step S203, the controller 30 compares a preceding full charge capacity Ah_c with the full charge capacity Ah_tag obtained in the processing at step S201. The preceding full charge capacity Ah_c refers to the past (preceding) full charge capacity calculated before the processing at step S201 is performed. When the learning of the full charge capacity (the processing at step S201) is performed for the first time, the full charge capacity Ah_c is set at an initial value. The full charge capacity Ah_c as the initial value can be previously determined by an experiment or the like immediately after the assembled battery 10 is manufactured, for example.

When the full charge capacity Ah_tag is smaller than the full charge capacity Ah_c, the controller 30 proceeds to processing at step S204. When the full charge capacity Ah_tag is larger than the full charge capacity Ah_c, the controller 30 proceeds to processing at step S205. Since the assembled battery 10 tends to be deteriorated due to its continuous use, the last full charge capacity Ah_tag tends to be smaller than the past full charge capacity Ah_c. Depending on the detection error in the monitor unit 20 or the current sensor 41 or the like, the full charge capacity Ah_tag may be larger than the full charge capacity Ah_c.

At step S204, the controller 30 acquires the current I of the assembled battery 10 in the output from the current sensor 41 and determines whether or not the current I is larger than a discharge threshold value Id_th. The discharge threshold value Id_th is used for determining whether or not the assembled battery 10 is discharged. The discharge of the assembled battery 10 refers to a state in which the electric power output from the assembled battery 10 is supplied to the motor generator 44 to run the vehicle.

For example, the discharge threshold value Id_th can be set at zero. Since the discharge current is larger than zero as described above, the discharge of the assembled battery 10 can be determined when the detected current I is larger than the discharge threshold value Id_th (=0). For taking account of the detection error in the current sensor 41, the discharge threshold value Id_th can be set at a value larger than zero. This allows the determination of whether or not the assembled battery 10 is discharged to be made in consideration of the detection error in the current sensor 41. The discharge threshold value Id_th (>0) in this case can be set as appropriate in consideration of the error in the current sensor 41.

The electric power output from the assembled battery 10 may be supplied not only to the motor generator 44 but also to auxiliaries mounted on the vehicle. Examples of the auxiliaries include an air-conditioner and lighting equipment. When the electric power output from the assembled battery 10 is supplied only to the auxiliaries, the vehicle is not in the running state. To ensure that the vehicle runs with the assembled battery 10 discharged, the discharge threshold value Id_th can be set at a value larger than zero by taking account of the current consumed in the auxiliaries.

When the detected current I is larger than the discharge threshold value Id_th at step S204, in other words, when it is determined that the assembled battery 10 is discharged, the controller 30 proceeds to processing at step S206. On the other hand, when the detected current I is equal to or lower than the discharge threshold value Id_th, in other words, when it is determined that the assembled battery 10 is not discharged, the controller 30 proceeds to processing at step S207. Examples of the case when the assembled battery 10 is not discharged include the case when the assembled battery 10 is not charged and discharged and the case when the assembled battery 10 is charged.

At step S206, the controller 30 sets a capacity change amount $\Delta Ah$ at a value larger than zero. The capacity change amount $\Delta Ah$ represents an amount by which the full charge capacity for use in calculating the cruising distance is changed. The setting of the capacity change amount $\Delta Ah$ at the value larger than zero can reduce the full charge capacity for use in calculating the cruising distance as later described. The method of setting the capacity change amount $\Delta Ah$ can be determined as appropriate.

Figure 4:
FIG. 4 is a graph showing the relationship between a capacity change amount and a discharge current in Embodiment 1.

For example, as shown in FIG. 4, the capacity change amount $\Delta Ah$ can be set at a fixed value $\Delta Ah\_fix1$ regardless of the discharge current of the assembled battery 10. The fixed value $\Delta Ah\_fix1$ is a positive value, and information about the fixed value $\Delta Ah\_fix1$ can be stored in the memory 31.

Figure 5:
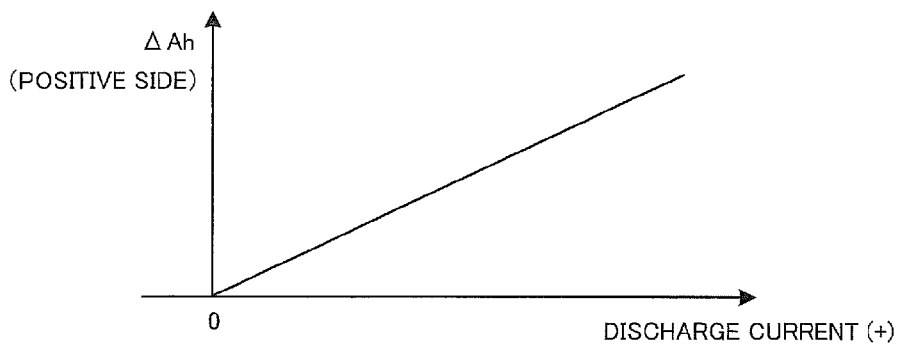
FIG. 5 is a graph showing the relationship between the capacity change amount and the discharge current in Embodiment 1.

Alternatively, as shown in FIG. 5, the capacity change amount $\Delta Ah$ can be changed with the discharge current of the assembled battery 10. In a map shown in FIG. 5, the capacity change amount $\Delta Ah$ can be increased as the discharge current is increased. In the example shown in FIG. 5, the discharge current can be multiplied by a coefficient (a positive value) to calculate the capacity change amount $\Delta Ah$. The map shown in FIG. 5 can be stored in the memory 31.

The controller 30 proceeds from step S206 to processing at step S210 to set a full charge capacity Ah_disp[n+1] for use in calculating the cruising distance. Once the full charge capacity Ah_disp is set, the cruising distance based on the full charge capacity Ah_disp can be calculated, and the information about the cruising distance can be displayed on the display 32.

At step S210, the controller 30 calculates the full charge capacity Ah_disp[n+1] by subtracting the capacity change amount $\Delta Ah$ set in the processing at step S206 from the full charge capacity Ah_disp[n], where n represents the number of settings of the capacity change amount $\Delta Ah$ and is increased as the number of settings of the capacity change amount ΔAh is increased. When the capacity change amount ΔAh is set for the first time, the full charge capacity Ah_c is used as the full charge capacity Ah_disp[n].

When the full charge capacity Ah_tag and the full charge capacity Ah_c are different from each other, the last full charge capacity Ah_tag needs to be used as the full charge capacity Ah_disp for use in calculating the cruising distance. Until the full charge capacity Ah_tag is learned, the full charge capacity Ah_c is set as the full charge capacity Ah_disp.

If the full charge capacity Ah_disp is immediately changed from the full charge capacity Ah_c to the full charge capacity Ah_tag, the cruising distance is also changed immediately in response to the change in the full charge capacity Ah_disp. This may give an unnatural feeling to the driver or the like who observes the display 32 displaying the cruising distance. For example, when the full charge capacity Ah_tag is smaller than the full charge capacity Ah_c, and the full charge capacity Ah_disp is immediately changed from the full charge capacity Ah_c to the full charge capacity Ah_tag, the cruising distance is also changed immediately. If the cruising distance is immediately reduced, it tends to give the unnatural feeling to the driver.

To address this, in the present embodiment, when the full charge capacity Ah_tag is smaller than the full charge capacity Ah_c, the full charge capacity Ah_disp is reduced and brought closer to the full charge capacity Ah_tag from the full charge capacity Ah_c only if the assembled battery 10 is discharged. Since the cruising distance is reduced due to the running of the vehicle with the discharge of the assembled battery 10, the reduction in the full charge capacity Ah_disp and thus the reduction in the cruising distance during the discharge of the assembled battery 10 do not give the unnatural feeling to the driver.

In bringing the full charge capacity Ah_disp to the full charge capacity Ah_tag from the full charge capacity Ah_c, the full charge capacity Ah_disp is preferably reduced stepwise. Depending on the relationship between the difference between the full charge capacity Ah_c and the full charge capacity Ah_tag and the discharge amount of the assembled battery 10, the unnatural feeling may be given to the driver.

For example, when the difference between the full charge capacities Ah_c and Ah_tag is large, and the assembled battery 10 is slightly discharged to change the full charge capacity Ah_disp from the full charge capacity Ah_c to the full charge capacity Ah_tag, it easily gives the unnatural feeling to the driver. Specifically, despite the slight discharge of the assembled battery 10, the cruising distance calculated from the full charge capacity Ah_disp is extremely reduced to give the unnatural feeling to the driver. The stepwise reduction in full charge capacity Ah_disp from the full charge capacity Ah_c to the full charge capacity Ah_tag can avoid the unnatural feeling to the driver.

To reduce the full charge capacity Ah_disp stepwise, the capacity change amount ΔAh needs to be smaller than the difference between the full charge capacity Ah_c and the full charge capacity Ah_tag. When the difference between the full charge capacities Ah_c and Ah_tag is small, the change in the full charge capacity Ah_disp from the full charge capacity Ah_c to the full charge capacity Ah_tag caused by the slight discharge of the assembled battery 10 can avoid the unnatural feeling to the driver. In this manner, the capacity change amount ΔAh can be set from the viewpoint of avoiding the unnatural feeling to the driver or the like who checks the cruising distance displayed on the display 32.

Since the capacity change amount ΔAh is set at the fixed value ΔAh_fix1 in the example shown in FIG. 4, the fixed value ΔAh_fix1 can be previously set in view of the facts described above. On the other hand, in the example shown in FIG. 5, the capacity change amount ΔAh is increased as the discharge current is increased. As the discharge current is increased, the running distance of the vehicle tends to be increased to reduce the cruising distance. Thus, the capacity change amount ΔAh can be increased as the discharge current is increased. In this case, with the reduced unnatural feeling given to the driver for the cruising distance, the full charge capacity Ah_disp can be quickly changed from the full charge capacity Ah_c to the full charge capacity Ah_tag.

At step S207, the controller 30 sets the capacity change amount ΔAh at zero. Since the full charge capacity Ah_tag is smaller than the full charge capacity Ah_c when the controller 30 proceeds from step S203 to step S207, the full charge capacity Ah_disp needs to be reduced. However, when the controller 30 proceeds from step S204 to step S207, the assembled battery 10 is not charged and discharged, or the assembled battery 10 is charged. If the full charge capacity Ah_disp is reduced, the cruising distance is reduced although the assembled battery 10 is not charged and discharged or although the assembled battery 10 is charged. In this case, the unnatural feeling is given to the driver.

In the present embodiment, when the full charge capacity Ah_disp needs to be reduced, but the assembled battery 10 is not charged and discharged or the assembled battery 10 is charged, the capacity change amount ΔAh is set at zero to avoid a reduction in the full charge capacity Ah_disp. This can prevent the unnatural feeling from being given to the driver due to an unintended reduction in cruising distance.

At step S211, the controller 30 determines whether or not the full charge capacity Ah_disp set in the processing at step 210 is equal to the full charge capacity Ah_tag obtained in the processing at step S201. When the full charge capacity Ah_disp reaches the full charge capacity Ah_tag, the processing shown in FIG. 3 is ended. When the full charge capacity Ah_disp does not reach the full charge capacity Ah_tag, the controller 30 returns to the processing at step S203. The processing at step S206 and S210 can be repeated to bring the full charge capacity Ah_disp to the full charge capacity Ah_tag.

When the controller 30 proceeds from step S203 to processing at step S205, the controller 30 acquires the current I of the assembled battery 10 in the output from the current sensor 41 and determines whether or not the current I is smaller than a charge threshold value Ic_th. The charge threshold value Ic_th is used for determining whether or not the assembled battery 10 is charged. The charge of the assembled battery 10 refers to a state in which the regenerative power produced in braking of the vehicle is supplied to the assembled battery 10.

For example, the charge threshold value Ic_th can be set at zero. As described above, since the current during the charge of the assembled battery 10 is smaller than zero, the charge of the assembled battery 10 can be determined when the current detected by the current sensor 41 is smaller than the charge threshold value Ic_th (=0). For taking account of the detection error in the current sensor 41, the charge threshold value Ic_th can be set at a value smaller than zero. This allows the determination of whether or not the assembled battery 10 is charged to be made in consideration of the detection error in the current sensor 41. The charge threshold value Ic_th (<0) in this case can be set as appropriate in consideration of the error in the current sensor 41.

When the current I is smaller than the charge threshold value Ic_th at step S205, in other words, when the assembled battery 10 is charged, the controller 30 proceeds to processing at step S208. When the current I is larger than the charge threshold value Ic_th, in other words, when the assembled battery 10 is not charged, the controller 30 proceeds to processing at step S209. Examples of the case when the assembled battery 10 is not charged include the case when the assembled battery 10 is not discharged and charged and the case when the assembled battery 10 is discharged.

At step S208, the controller 30 sets the capacity change amount ΔAh at a value smaller than zero. The setting of the capacity change amount ΔAh at the value smaller than zero (a negative value) can increase the full charge capacity Ah_disp for use in calculating the cruising distance. In the processing at step S210, the capacity change amount ΔAh is subtracted from the full charge capacity Ah_disp[n] to calculate the full charge capacity Ah_disp[n+1]. Since the capacity change amount ΔAh has the negative value in this case, the full charge capacity Ah_disp is increased.

Figure 6:
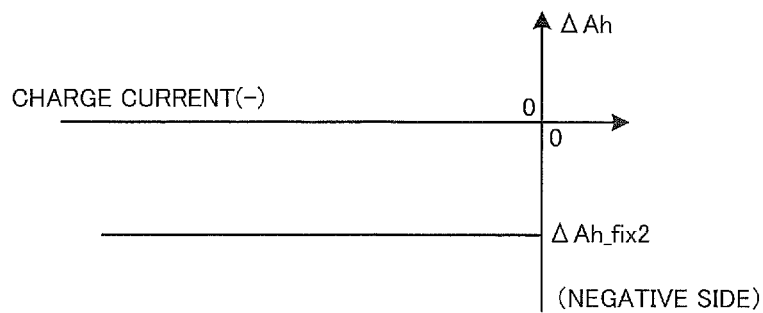
FIG. 6 is a graph showing the relationship between the capacity change amount and a charge current in Embodiment 1.

The method of setting the capacity change amount ΔAh can be determined as appropriate. For example, as shown in FIG. 6, the capacity change amount ΔAh used in the processing at step S208 can be set at a fixed value ΔAh_fix2 as a negative value regardless of the charge current of the assembled battery 10. The information about the fixed value ΔAh_fix2 can be stored in the memory 31.

Figure 7:
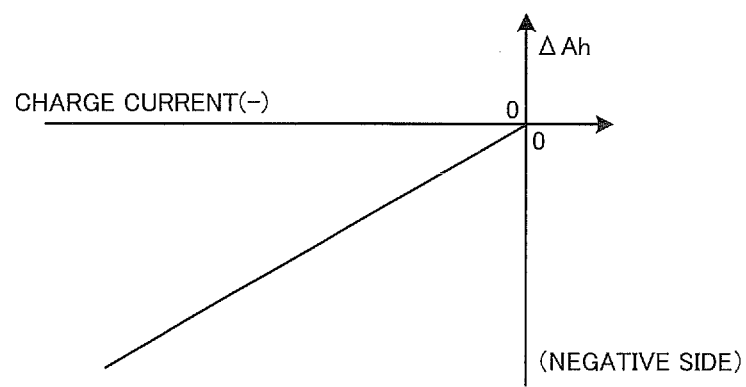
FIG. 7 is a graph showing the relationship between the capacity change amount and the charge current in Embodiment 1.

Alternatively, as shown in FIG. 7, the capacity change amount ΔAh used in the processing at step S208 can be changed with the charge current of the assembled battery 10. In a map shown in FIG. 7, as the charge current is reduced, the capacity change amount ΔAh as the negative value can be reduced, in other words, the absolute value of the capacity change amount ΔAh can be increased. The map shown in FIG. 7 can be stored in the memory 31.

When the controller 30 proceeds from step S208 to the processing step S210, the controller 30 calculates the full charge capacity Ah_disp[n+1] used in calculating the cruising distance. Specifically, the controller 30 adds the capacity change amount ΔAh set in the processing at step S208 to the full charge capacity Ah_disp[n] to calculate the full charge capacity Ah_disp[n+1]. When the capacity change amount ΔAh is set for the first time, the full charge capacity Ah_c is used as the full charge capacity Ah_disp[n].

When the full charge capacity Ah_tag and the full charge capacity Ah_c are different from each other, the last full charge capacity Ah_tag needs to be used as the full charge capacity Ah_disp for use in calculating the cruising distance. If the full charge capacity Ah_disp is immediately changed from the full charge capacity Ah_c to the full charge capacity Ah_tag, the cruising distance is also changed immediately in response to the change in the full charge capacity Ah_disp. This may give the unnatural feeling to the driver or the like who observes the display 32 displaying the cruising distance.

For example, when the full charge capacity Ah_tag is larger than the full charge capacity Ah_c, and the full charge capacity Ah_disp is immediately changed from the full charge capacity Ah_c to the full charge capacity Ah_tag, the cruising distance is also increased immediately. The instant increase in the cruising distance tends to give the unnatural feeling to the driver.

To address this, in the present embodiment, when the full charge capacity Ah_tag is larger than the full charge capacity Ah_c, the full charge capacity Ah_disp is increased and brought closer to the full charge capacity Ah_tag from the full charge capacity Ah_c only if the assembled battery 10 is charged. Since the cruising distance is increased due to the charge of the assembled battery 10, the increase in the full charge capacity Ah_disp and thus the increase in the cruising distance during the charge of the assembled battery 10 do not give the unnatural feeling to the driver.

In bringing the full charge capacity Ah_disp to the full charge capacity Ah_tag from the full charge capacity Ah_c, the full charge capacity Ah_disp is preferably increased stepwise. Depending on the relationship between the difference between the full charge capacity Ah_c and the full charge capacity Ah_tag and the charge amount of the assembled battery 10, the unnatural feeling may be given to the driver.

For example, when the difference between the full charge capacities Ah_c and Ah_tag is large, and the assembled battery 10 is slightly charged to change the full charge capacity Ah_disp from the full charge capacity Ah_c to the full charge capacity Ah_tag, it easily gives the unnatural feeling to the driver. Specifically, despite the slight charge of the assembled battery 10, the cruising distance calculated from the full charge capacity Ah_disp is extremely increased to give the unnatural feeling to the driver. The stepwise increase in the full charge capacity Ah_disp from the full charge capacity Ah_c to the full charge capacity Ah_tag can avoid the unnatural feeling to the driver.

To increase the full charge capacity Ah_disp stepwise, the capacity change amount ΔAh needs to be smaller than the difference between the full charge capacity Ah_c and the full charge capacity Ah_tag. When the difference between the full charge capacities Ah_c and Ah_tag is small, the change in the full charge capacity Ah_disp from the full charge capacity Ah_c to the full charge capacity Ah_tag caused by the slight charge of the assembled battery 10 can avoid the unnatural feeling to the driver. In this manner, the capacity change amount ΔAh can be set from the viewpoint of avoiding the unnatural feeling to the driver or the like who checks the cruising distance displayed on the display 32.

Since the capacity change amount ΔAh is set at the fixed value ΔAh_fix2 in the example shown in FIG. 6, the fixed value ΔAh_fix2 can be previously set in view of the facts described above. On the other hand, in the example shown in FIG. 7, the absolute value of the capacity change amount ΔAh is increased as the charge current is increased, in other words, as the current detected by the current sensor 41 is reduced. Since the cruising distance tends to be increased as the charge current is increased, the capacity change amount ΔAh can be increased as the charge current is increased. In this case, with the reduced unnatural feeling given to the driver for the cruising distance, the full charge capacity Ah_disp can be quickly switched from the full charge capacity Ah_c to the full charge capacity Ah_tag.

At step S209, the controller 30 sets the capacity change amount ΔAh at zero. Since the full charge capacity Ah_tag is larger than the full charge capacity Ah_c when the controller 30 proceeds from step S203 to step S209, the full charge capacity Ah_disp needs to be increased. However, when the controller 30 proceeds from step S205 to step S209, the assembled battery 10 is not charged and discharged, or the assembled battery 10 is discharged. If the full charge capacity Ah_disp is increased, the cruising distance is increased although the assembled battery 10 is not charged or although the assembled battery 10 is discharged. In this case, the unnatural feeling is given to the driver.

In the present embodiment, when the full charge capacity Ah_disp needs to be increased, but the assembled battery 10 is not charged or the assembled battery 10 is discharged, the capacity change amount ΔAh is set at zero to avoid an increase in the full charge capacity Ah_disp. This can prevent the unnatural feeling from being given to the driver due to an unintended increase in the cruising distance.

At step S211, the controller 30 determines whether or not the full charge capacity Ah_disp set in the processing at step 210 is equal to the full charge capacity Ah_tag obtained in the processing at step S201. When the full charge capacity Ah_disp reaches the full charge capacity Ah_tag, the processing shown in FIG. 3 is ended. When the full charge capacity Ah_disp does not reach the full charge capacity Ah_tag, the controller 30 returns to the processing at step S203. The processing at step S208 and S210 can be repeated to bring the full charge capacity Ah_disp to the full charge capacity Ah_tag.

In the present embodiment, when the full charge capacity Ah_tag is smaller than the full charge capacity Ah_c, the full charge capacity Ah_disp is reduced to the full charge capacity Ah_tag from the full charge capacity Ah_c only if the assembled battery 10 is discharged. However, the present invention is not limited thereto.

Specifically, regardless of whether or not the assembled battery 10 is discharged, the full charge capacity Ah_disp may be reduced to the full charge capacity Ah_tag from the full charge capacity Ah_c. However, when the assembled battery 10 is not discharged, the cruising distance based on the full charge capacity Ah_disp before it is reduced can be used as the cruising distance displayed on the display 32. As a result, the cruising distance displayed on the display 32 is the same as that in the present embodiment.

In the present embodiment, when the full charge capacity Ah_tag is larger than the full charge capacity Ah_c, the full charge capacity Ah_disp is increased to the full charge capacity Ah_tag from the full charge capacity Ah_c only if the assembled battery 10 is charged. However, the present invention is not limited thereto.

Specifically, regardless of whether or not the assembled battery 10 is charged, the full charge capacity Ah_disp may be increased to the full charge capacity Ah_tag from the full charge capacity Ah_c. When the assembled battery 10 is not charged, the cruising distance based on the full charge capacity Ah_disp before it is increased can be used as the cruising distance displayed on the display 32. As a result, the cruising distance displayed on the display 32 is the same as that in the present embodiment.

Figure 8:
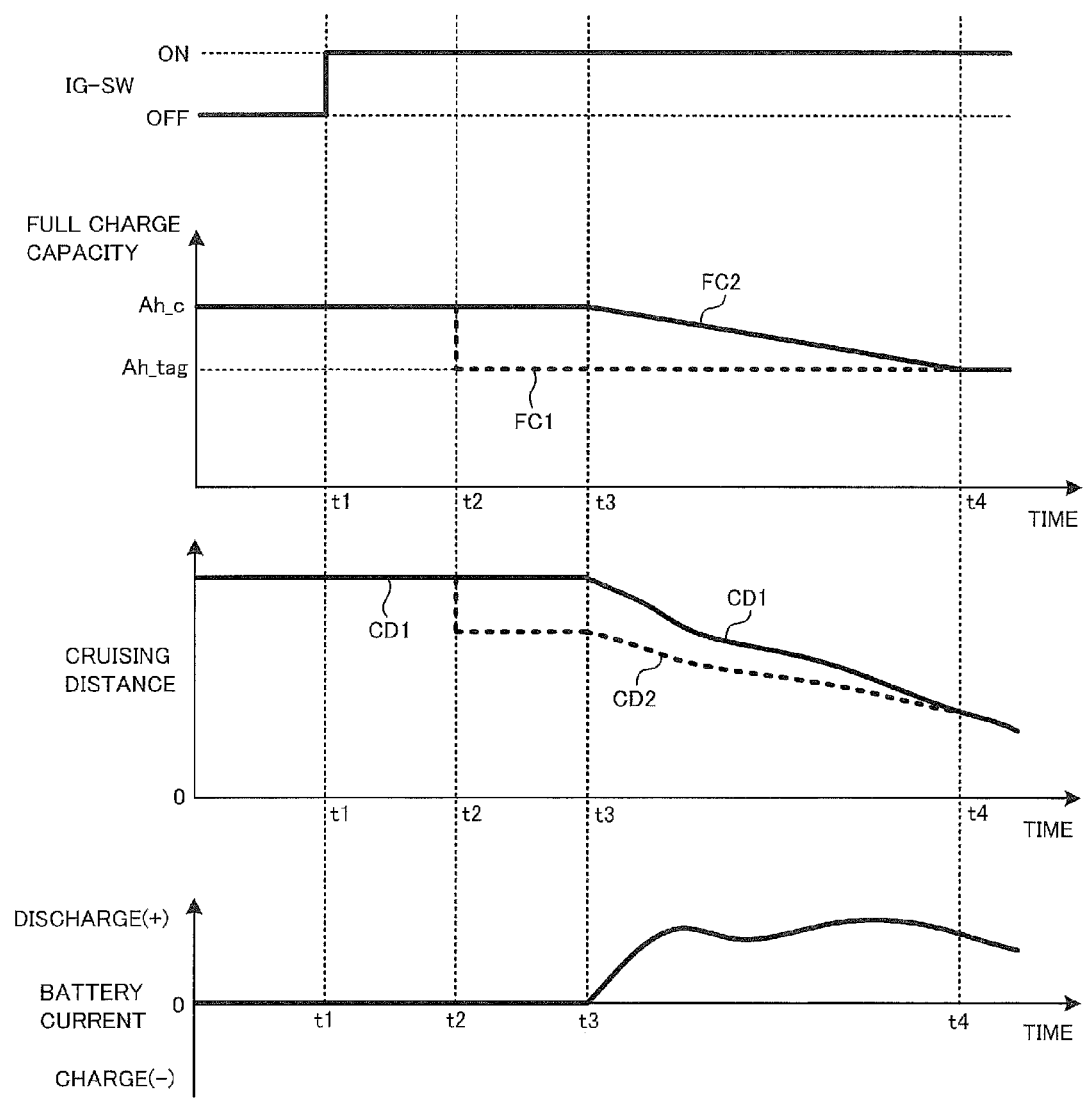
FIG. 8 shows graphs of the relationship between the full charge capacity, the cruising distance, and a battery current in Embodiment 1.

FIG. 8 shows changes in the cruising distance displayed on the display 32 when the full charge capacity Ah_tag is lower than the full charge capacity Ah_c. In FIG. 8, the ignition switch is switched from OFF to ON at a time t1, and the external charge is performed before the time t1.

After the ignition switch is switched from OFF to ON (after the time t1), the full charge capacity Ah_tag is calculated at a time t2. Although the full charge capacity Ah_tag is calculated at the time t2 when a predetermined time has elapsed since the time t1 in FIG. 8, the full charge capacity Ah_tag may be calculated at the time t1. After the full charge capacity Ah_tag is calculated, in other words, after the time t2, the SOC of the assembled battery 10 is calculated based on the full charge capacity Ah_tag as described above. The full charge capacity for use in calculating the SOC is shown by a dotted line FC1 in FIG. 8.

For the cruising distance displayed on the display 32, a solid line CD1 in FIG. 8 indicates a cruising distance calculated on the basis of the full charge capacity Ah_c, and a dotted line CD2 in FIG. 8 indicates a cruising distance calculated on the basis of the full charge capacity Ah_tag. The display 32 displays only the cruising distance shown by the solid line CD1 but does not display the cruising distance shown by the dotted line CD2.

In the present embodiment, as shown by the solid line CD1, the cruising distance is calculated on the basis of the full charge capacity Ah_c even after the time t2. Since the assembled battery 10 is not charged and discharged and the current of the battery 10 remains zero in the period from the time t2 to a time t3, the cruising distance CD1 is not changed even after the time t2.

When the assembled battery 10 is discharged to run the vehicle at the time t3, the full charge capacity Ah_disp for use in calculating the cruising distance CD1 is gradually reduced from the full charge capacity Ah_c to the full charge capacity Ah_tag as shown in a solid line FC2 in FIG. 8. In the example shown in FIG. 8, the fixed value ΔAh_fix1 (see FIG. 4) is used as the capacity change amount ΔAh to reduce the full charge capacity Ah_disp shown by the solid line FC2 at a constant change rate.

After the time t3, the cruising distance CD1 is calculated on the basis of the full charge capacity Ah_disp shown by the solid line FC2. When the assembled battery 10 is discharged to run the vehicle, the cruising distance CD1 is reduced. Specifically, the cruising distance CD1 at an arbitrary time after the time t3 can be determined by subtracting a current sum value obtained from the time t3 to the arbitrary time from the full charge capacity Ah_disp of the assembled battery 10. In the present embodiment, since the full charge capacity Ah_disp for use in calculating the cruising distance CD1 is reduced as shown by the solid line FC2, the cruising distance CD1 is easily reduced.

The full charge capacity Ah_disp is brought closer to the full charge capacity Ah_tag from the full charge capacity Ah_c as shown by the solid line FC2 to bring the cruising distance CD1 closer to the cruising distance CD2. At a time t4, the full charge capacity Ah_disp reaches the full charge capacity Ah_tag, and the cruising distance CD1 matches the cruising distance CD2. After the time t4, the cruising distance CD1 is calculated on the basis of the full charge capacity Ah_tag.

As shown in FIG. 8, in response to the discharge of the assembled battery 10, the full charge capacity Ah_disp is gradually reduced from the full charge capacity Ah_c to the full charge capacity Ah_tag to allow the cruising distance CD1 to gradually approach the cruising distance CD2. As a result, the full charge capacity Ah_disp can be changed from the full charge capacity Ah_c to the full charge capacity Ah_tag without giving the unnatural feeling to the driver who checks the cruising distance displayed on the display 32.

In the example shown in FIG. 8, the fixed value ΔAh_fix1 is used as the capacity change amount ΔAh. On the other hand, when the capacity change amount ΔAh is changed with the discharge current of the assembled battery 10 as shown in FIG. 5, the full charge capacity Ah_disp shown by the solid line FC2 is changed with the discharge current. Specifically, as the discharge current is increased, the reduction amount of the full charge capacity Ah_disp is increased, and as the discharge current is reduced, the reduction amount of the full charge capacity Ah_disp is reduced.

In the present embodiment, at the time t2 when the full charge capacity Ah_tag is calculated, the full charge capacity for calculating the SOC of the assembled battery 10 is changed from the full charge capacity Ah_c to the full charge capacity Ah_tag. However, the present invention is not limited thereto. Specifically, the full charge capacity used in calculating the SOC can also be changed similarly to the full charge capacity for use in calculating the cruising distance. In other words, the solid line FC2 shown in FIG. 8 is used instead of the dotted line FC1.

Embodiment 2

A battery system which is Embodiment 2 of the present invention will hereinafter be described. In the present embodiment, the components identical to those described in Embodiment 1 are designated with the same reference numerals, and detailed description thereof is omitted. The following description is mainly focused on differences from Embodiment 1.

Figure 9:
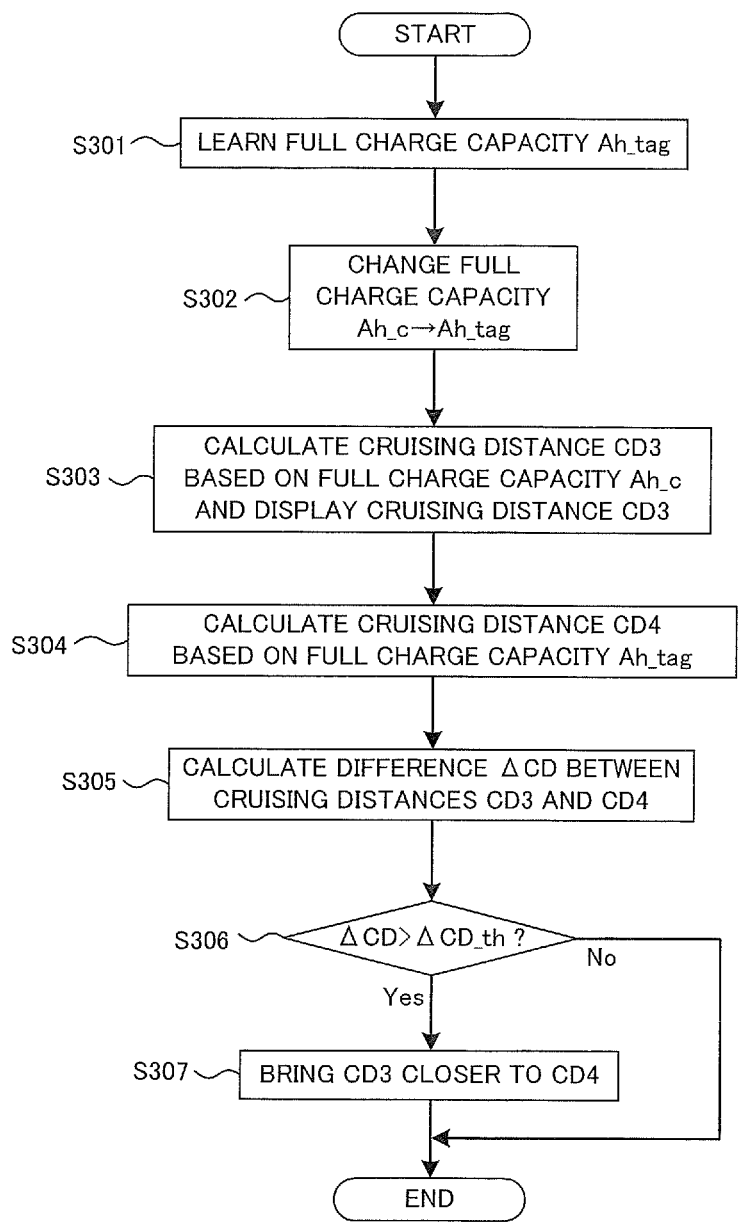
FIG. 9 is a flow chart showing processing of setting a cruising distance in Embodiment 2.
Figure 10:
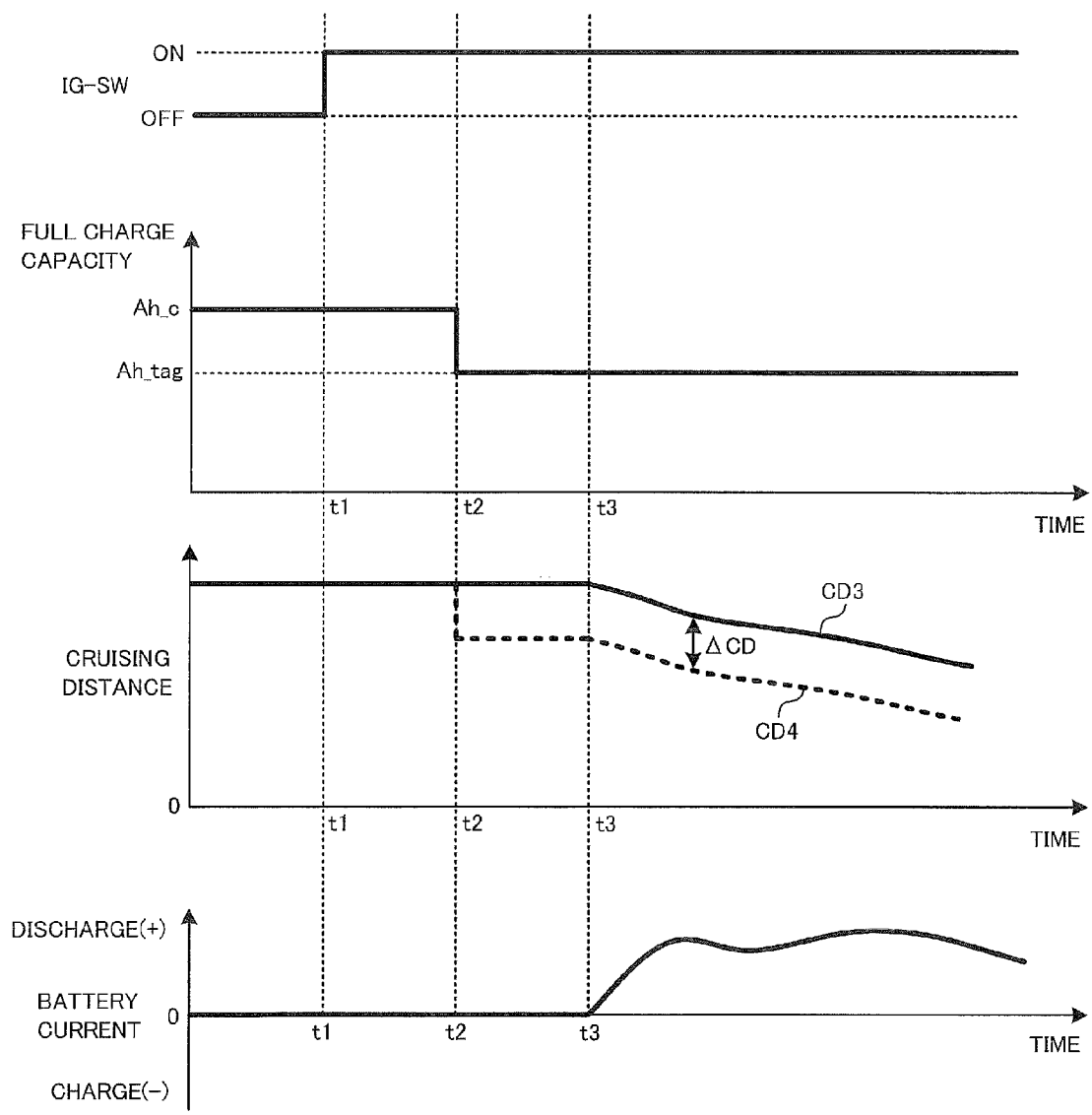
FIG. 10 shows graphs of the relationship between a full charge capacity, the cruising distance, and a battery current in Embodiment 2.

FIG. 9 is a flow chart showing processing of displaying a cruising distance on the display 32 in the present embodiment. The processing shown in FIG. 9 is performed by the controller 30. FIG. 10 is a diagram corresponding to FIG. 8 described in Embodiment 1 and shows changes in a full charge capacity and a cruising distance.

At step S301, the controller 30 calculates a full charge capacity Ah_tag of the assembled battery 10. The method of calculating the full charge capacity Ah_tag is identical to the method (the processing at step S201) described in Embodiment 1. In the example shown in FIG. 10, the full charge capacity Ah_tag is calculated at a time t2.

At step S302, the controller 30 changes a full charge capacity for use in calculating the SOC of the assembled battery 10 and a full charge capacity for use in calculating the cruising distance from a full charge capacity Ah_c to the full charge capacity Ah_tag. In the example shown in FIG. 10, the change from the full charge capacity Ah_c to the full charge capacity Ah_tag is performed at the time t2.

At step S303, the controller 30 calculates a cruising distance CD3 to be displayed on the display 32 based on the full charge capacity Ah_c and displays the calculated cruising distance CD3 on the display 32. In the present embodiment, as described in the processing at step S302, the full charge capacity for use in calculating the cruising distance is changed from the full charge capacity Ah_c to the full charge capacity Ah_tag, but the cruising distance to be displayed on the display 32 is calculated on the basis of the full charge capacity Ah_c before the change.

At step S304, the controller 30 calculates a cruising distance CD4 on the basis of the full charge capacity Ah_tag. Since the full charge capacity Ah_tag is smaller than the full charge capacity Ah_c, the cruising distance CD4 is smaller than the cruising distance CD3 as shown in FIG. 10.

At step S305, the controller 30 calculates a difference ΔCD between the cruising distances CD3 and CD4. The cruising distances CD3 and CD4 in calculating the difference ΔCD are the values calculated at the same time. As the difference between the full charge capacities Ah_c and Ah_tag is increased, the difference ΔCD between the cruising distances CD3 and CD4 is also increased.

At step S306, the controller 30 determines whether or not the difference LCD calculated in the processing at step S305 is larger than a threshold value ΔCD_th. The threshold value ΔCD_th can be set as appropriate, and for example, at zero. The setting of the threshold value ΔCD_th at zero can match the cruising distance CD3 with the cruising distance CD4 as described below. When the difference ΔCD is larger than the threshold value ΔCD_th at step S306, the controller 30 proceeds to processing at step S307. Otherwise, the controller 30 ends the processing shown in FIG. 9.

At step S307, the controller 30 brings the cruising distance CD3 closer to the cruising distance CD4. Specifically, when the assembled battery 10 is discharged to run the vehicle, the cruising distance CD3 can be brought closer to the cruising distance CD4. Once the cruising distance CD3 is matched with the cruising distance CD4, the cruising distance CD3 can be regarded as the cruising distance based on the full charge capacity Ah_tag.

When the reduction amount of the cruising distance CD3 in association with the discharge amount of the assembled battery 10 is set to be larger than the reduction amount of the cruising distance CD4 in association with the discharge amount of the assembled battery 10, the cruising distance CD3 can be brought closer to the cruising distance CD4. The cruising distance CD3 brought closer to the cruising distance CD4 can prevent an unnatural feeling from being given to a driver or the like.

The method of bringing the cruising distance CD3 closer to the cruising distance CD4 can be set as appropriate. The unnatural feeling to the driver or the like can be prevented by gradually bringing the cruising distance CD3 closer to the cruising distance CD4.

Although the present embodiment includes the change from the full charge capacity Ah_c to the full charge capacity Ah_tag when the full charge capacity Ah_tag is calculated, the full charge capacity Ah_c remains as the full charge capacity for use in calculating the cruising distance displayed on the display 32. Thus, the cruising distance is not changed in response to the change from the full charge capacity Ah_c to the full charge capacity Ah_tag, so that the unnatural feeling to the driver or the like can be prevented.

Although the example shown in FIG. 10 illustrates the case where the full charge capacity Ah_tag is smaller than the full charge capacity Ah_c, the present invention is also applicable when the full charge capacity Ah_tag is larger than the full charge capacity Ah_c. Specifically, the cruising distance displayed on the display 32 may be calculated on the basis of the full charge capacity Ah_c, the cruising distance based on the full charge capacity Ah_c and the cruising distance based on the full charge capacity Ah_tag may be calculated, and when the difference between those cruising distances is larger than the threshold value (for example, zero), the cruising distance based on the full charge capacity Ah_c may be bought closer to the cruising distance based on the full charge capacity Ah_tag.

The invention claimed is:

1. A vehicle comprising:
a motor generating a kinetic energy for use in running of the vehicle;
an electric storage apparatus charged and discharged and outputting a driving electric power for the motor;
a display displaying a cruising distance over which the vehicle can be run with the motor; and
a controller calculating the cruising distance based on a state of charge (SOC) of the electric storage apparatus and displaying the cruising distance on the display,
wherein the controller calculates the cruising distance based on the SOC and a reference full charge capacity of the electric storage apparatus, after the full charge capacity for calculating the SOC is calculated,
when the full charge capacity at a present time and the full charge capacity at a past time are different, to keep displaying the cruising distance calculated to the reference full charge capacity at the past time,
when the full charge capacity at the present time is smaller than the full charge capacity at the past time, the controller gradually changes the cruising distance to be displayed on the display from the displayed cruising distance calculated to the reference full charge capacity at the past time in accordance with a starting of the discharge of the electric storage apparatus after the full charge capacity is calculated, and
when the full charge capacity at the present time is larger than the full charge capacity at the past time, the controller gradually changes the cruising distance to be displayed on the display from the displayed cruising distance calculated to the reference full charge capacity at the past time in accordance with the starting of the charge of the electric storage apparatus after the full charge capacity is calculated.

2. The vehicle according to claim 1, wherein, when the full charge capacity at the present time is smaller than the full charge capacity at the past time, the controller brings the full charge capacity for use in calculating the cruising distance closer to the full charge capacity at the present time from the full charge capacity at the past time in response to the discharge of the electric storage apparatus after the full charge capacity is calculated.

3. The vehicle according to claim 2, wherein the controller does not perform any change from the full charge capacity at the past time to the full charge capacity at the present time when the electric storage apparatus is not discharged after the full charge capacity is calculated.

4. The vehicle according to claim 1, wherein, when the full charge capacity at the present time is larger than the full charge capacity at the past time, the controller brings the full charge capacity for use in calculating the cruising distance closer to the full charge capacity at the present time from the full charge capacity at the past time in response to the charge of the electric storage apparatus after the full charge capacity is calculated.

5. The vehicle according to claim 4, wherein the controller does not perform any change from the full charge capacity at the past time to the full charge capacity at the present time when the electric storage apparatus is not charged after the full charge capacity is calculated.

6. The vehicle according to claim 1, wherein when the full charge capacity at the present time and the full charge capacity at the past time are different, the controller changes the full charge capacity at the past time to the full charge capacity at the present time and displays the cruising distance calculated to the reference full charge capacity at the past time without the reference full charge capacity at the present time on the display, when the full charge capacity at the present time is smaller than the full charge capacity at the past time, the controller sets a change amount of the cruising distance in associated with the discharge amount of the electric storage apparatus to be larger than the change amount of the cruising distance calculated to the reference the full charge capacity at the present time in association with the discharge amount of the electric storage apparatus and brings closer to the cruising distance to be displayed on the display from the cruising distance at the past time to the cruising distance calculated to the reference full charge capacity at the present time, in accordance with the starting of the discharge of the electric storage apparatus after the full charge capacity is calculated.

7. A method of controlling, with a controller, a display displaying a cruising distance over which a vehicle can be run with a motor, comprising:

calculating a state of charge (SOC) and a full charge capacity of an electric storage apparatus;

calculating the cruising distance based on the SOC and a reference full charge capacity of the electric storage apparatus;

displaying the cruising distance on the display;

when the full charge capacity at a present time and the full charge capacity at a past time are different, to keep displaying the cruising distance calculated based on the reference full charge capacity at the past time;

when the full charge capacity at the present time is smaller than the full charge capacity at the past time, the controller gradually changes the cruising distance to be displayed on the display from the displayed cruising distance calculated based on the reference full charge capacity at the past time in accordance with the starting of the discharge of the electric storage apparatus after the full charge capacity is calculated; and when the full charge capacity at the present time is larger than the full charge capacity at the past time, the controller gradually changes the cruising distance to be displayed on the display from the displaying cruising distance calculated based on the reference full charge capacity at the past time in accordance with the starting of the charge of the electric storage apparatus after the full charge capacity is calculated.

8. A vehicle comprising:

a motor generating a kinetic energy for use in running of the vehicle;

an electric storage apparatus charged and discharged and outputting a driving electric power for the motor;

a display displaying a cruising distance over which the vehicle can be run with the motor; and a controller calculating the cruising distance based on a full charge capacity of the electric storage apparatus and displaying the cruising distance on the display, wherein the controller calculates the full charge capacity of the electric storage apparatus, when the full charge capacity at a present time is smaller than the full charge capacity at a past time and the electric storage apparatus is not discharged, or when the full charge capacity at the present time is larger than the full charge capacity at the past time and the electric storage apparatus is not charged, the controller displays the cruising distance based on the full charge capacity at the past time on the display, and wherein, when the full charge capacity at the present time is larger than the full charge capacity at the past time, the controller brings the full charge capacity for use in calculating the cruising distance closer to the full charge capacity at the present time from the full charge capacity at the past time in response to the charge of the electric storage apparatus.

* * * * *